Dec. 17, 1935.  R. R. WORRALL  2,024,675
CONVEYING APPARATUS FOR HARDENING ROOMS
Filed April 15, 1932  3 Sheets-Sheet 1
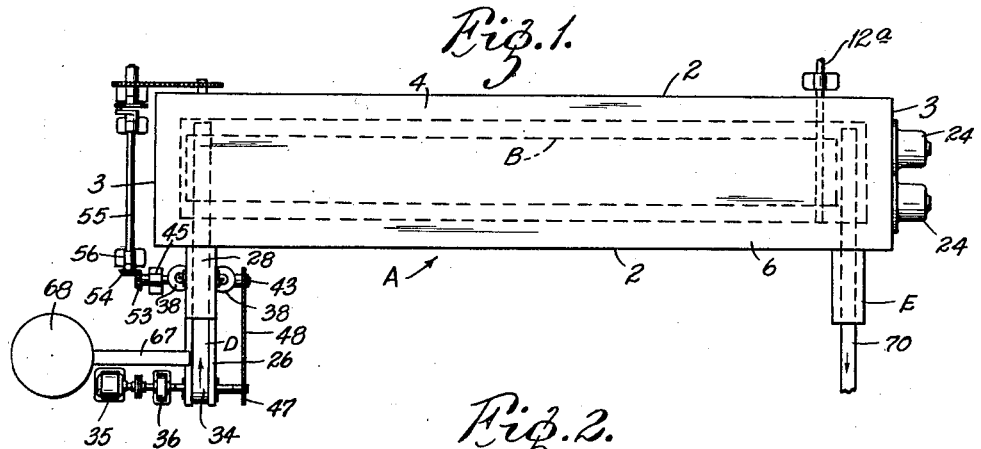
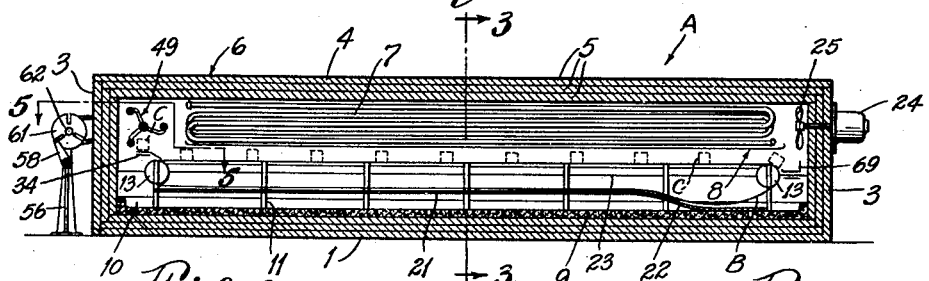
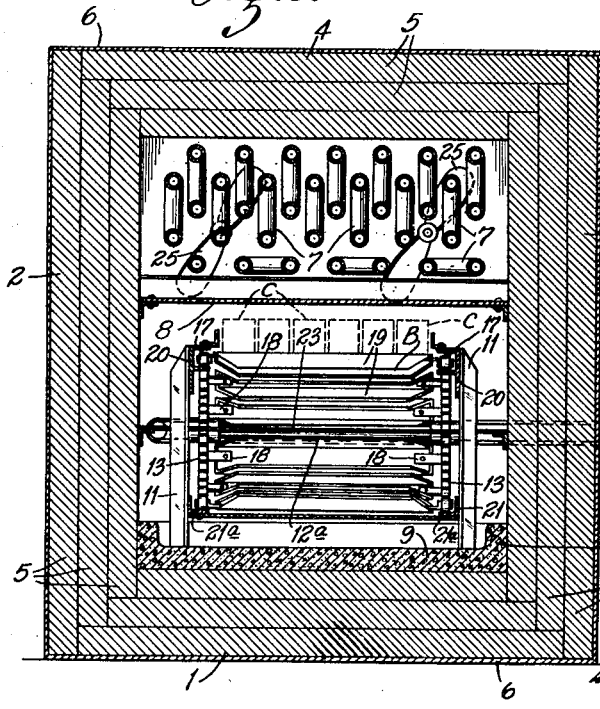
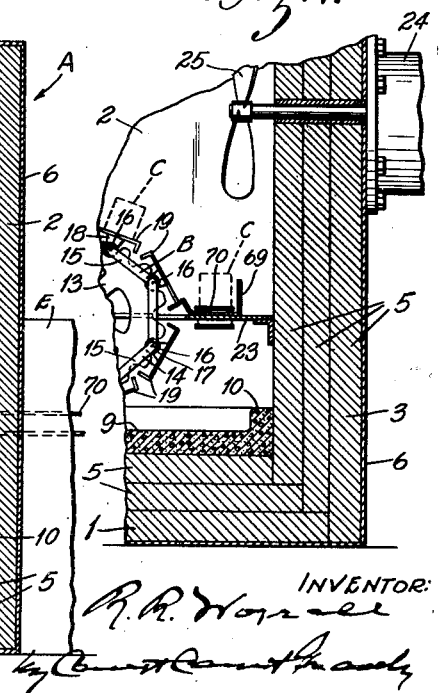
INVENTOR:
R. R. Worrall
HIS ATTORNEYS

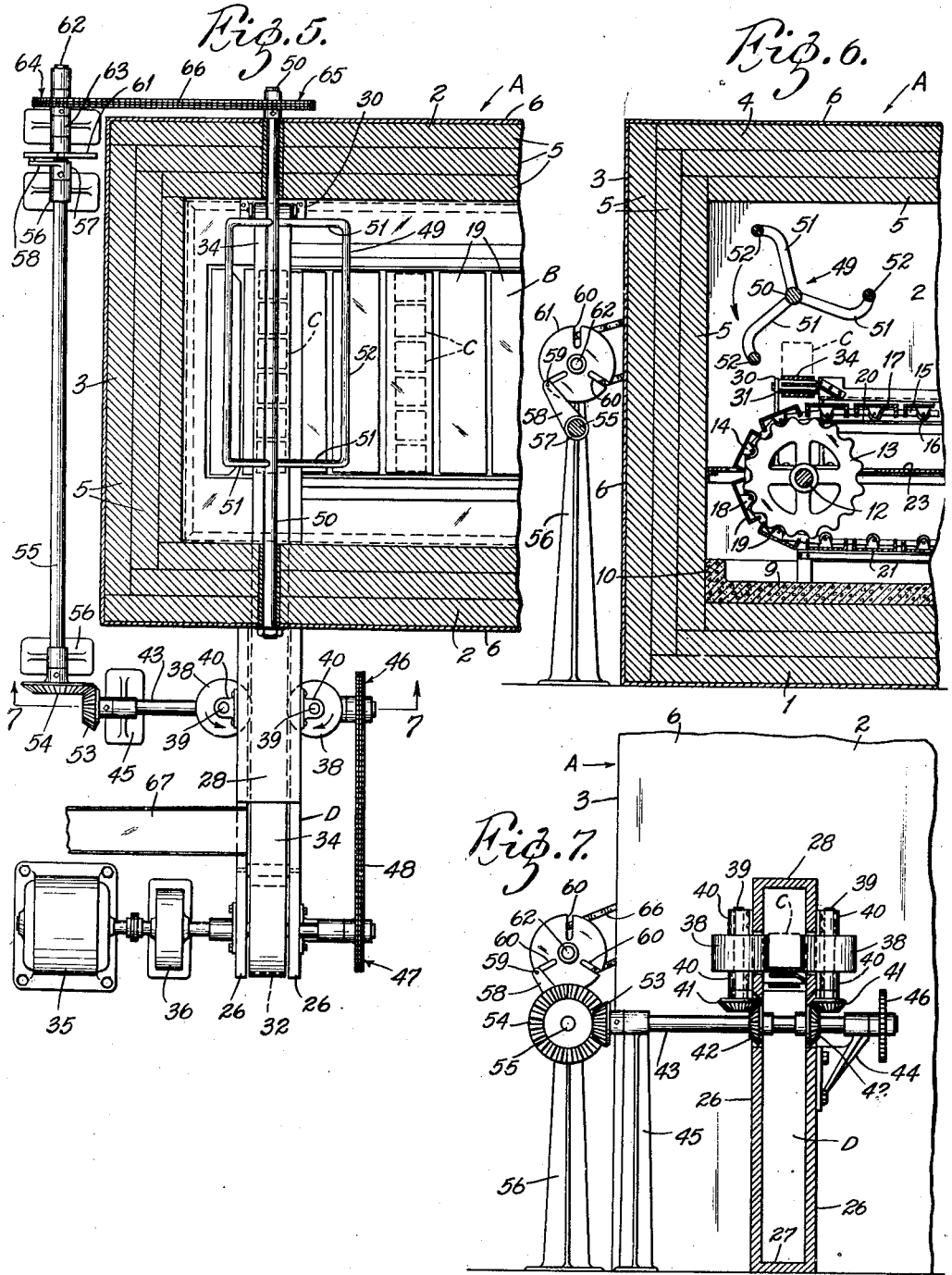

Dec. 17, 1935.  R. R. WORRALL  2,024,675
CONVEYING APPARATUS FOR HARDENING ROOMS
Filed April 15, 1932  3 Sheets-Sheet 3
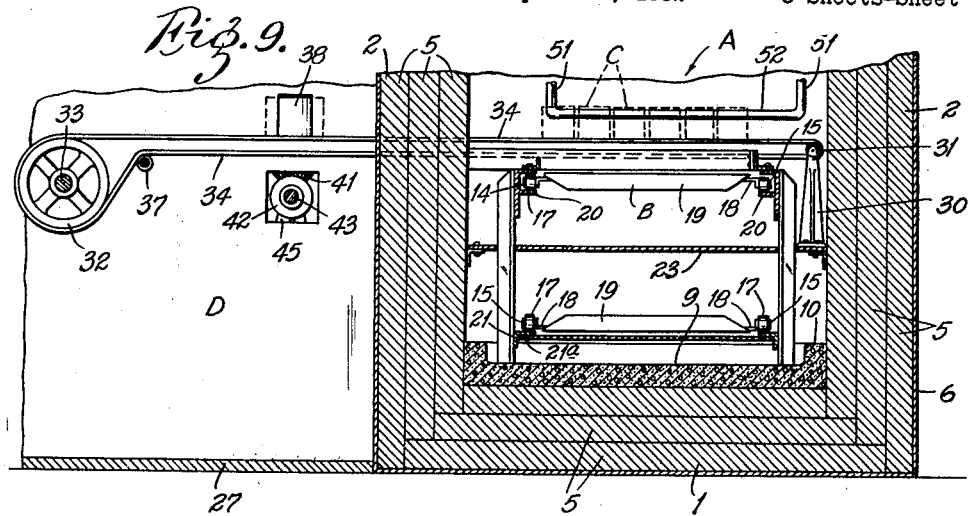
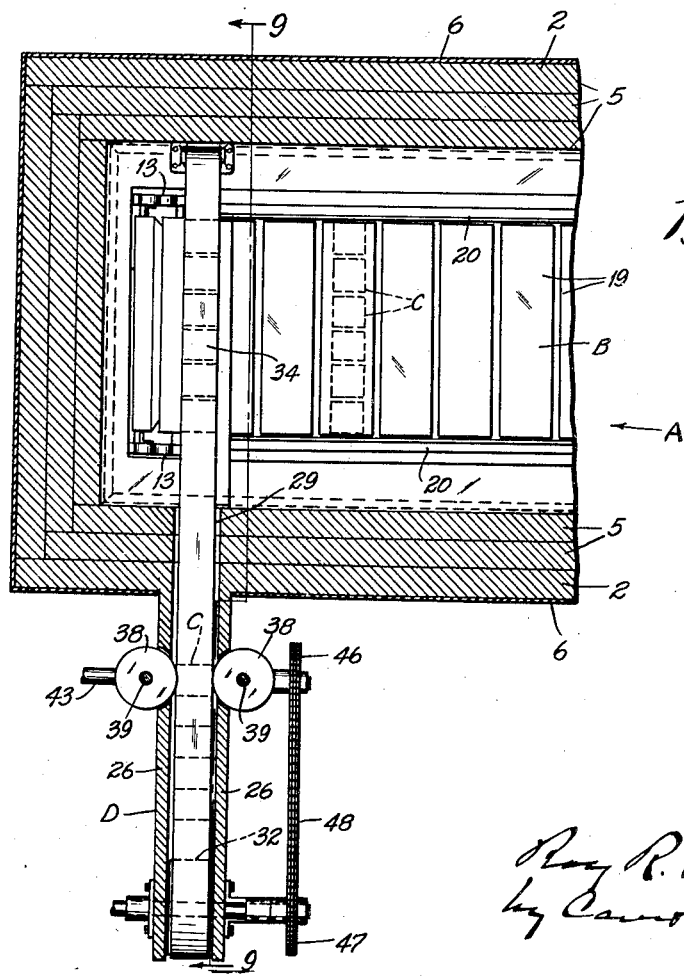
INVENTOR:
Roy R. Worrall
HIS ATTORNEYS Patented Dec. 17, 1935

2,024,675

UNITED STATES PATENT OFFICE 2,024,675

CONVEYING APPARATUS FOR HARDENING ROOMS

Roy R. Worrall, Webster Groves, Mo., assignor to Alvey Conveyor Manufacturing Co., a corporation of Missouri Application April 15, 1932, Serial No. 605,393

4 Claims. (Cl. 62—102)

My invention relates to conveying apparatus, particularly to conveying apparatus for transporting articles into and through an ice cream hardening room, or the like. It is common practice in the ice cream industry to harden the product of the freezers by placing it in containers, and then storing the containers in a hardening room held at a low temperature. Such storage is accomplished manually which sets a practical limit to the temperature of the hardening room. Due to the necessary lapse of time between the operations of filling the containers and placing them in the hardening room and the impracticability of maintaining the hardening room at an extremely low temperature for reasons set forth above, the product is likely to contain needles and crystals of frozen water which have separated out from the mixture. However, I have found that when the product is quickly transferred from the filling machine into a hardening room or tunnel, which is held at an extremely low temperature, the finished product will be free from ice crystals and will have a smooth even texture; and the principal object of the present invention is to provide conveying apparatus that will automatically space apart and deliver a number of articles into a room quickly and continuously, and then carry the articles therethrough without allowing them to contact with each other at any time after they have entered the room. Obviously, such type of conveying apparatus, when used for conveying containers of ice cream material into a hardening room, will allow the cold air within the room to get at all of the side portions of each container as it enters the room and thereby lessen the chance of crystals forming in the finished product.

My invention consists principally in a conveyor disposed wthin a room, such as an ice cream hardening rooom, and means for delivering articles onto the conveyor in such manner that they will be spaced apart and spread out over the carrying surface of the conveyor. The invention also consists in the parts, combinatons and arrangements of parts hereinafter described and claimed.

In the accompanying drawings which form part of this specification and wherein reference symbols refer to like parts wherever they occur, Fig. 1 is a plan view of an ice cream hardening room equipped with conveying apparatus embodying my inventon, Fig. 2 is a vertical longitudinal sectional view along the middle of Fig. 1, Fig. 3 is an enlarged sectional view along the line 3—3 in Fig. 2, Fig. 4 is a fragmentary sectional view on an enlarged scale of the right hand portion of Fig. 2, showing the rear lower end portion of the hardening room and the conveyor for carrying articles therefrom, Fig. 5 is an enlarged sectional view along the line 5—5 in Fig. 2, Fig. 6 is a vertical sectional view along the middle of the front end of the hardening room, Fig. 7 is a sectional view along the line 7—7 in Fig. 5, Fig. 8 is a horizontal sectional view looking down into the front end of the hardening room and onto the top of the conveyor for delivering articles therein, and Fig. 9 is a sectional view along the line 9—9 in Fig. 8.

In the construction illustrated, I have shown a narrow ice cream hardening room A made up of a floor 1, side walls 2, front and rear end walls 3, and a roof 4. The walls, the floor, and the roof of the room A are each made up of three layers 5 of insulating material, such as cork, and an outer covering 6 of metal lathe and plaster. Located in the upper half of the room A are coiled refrigerating pipes 7 supported in any suitable manner. These pipes are arranged in elongated loops that extend from a point near the front end of the room A to a point near the rear end thereof, and a horizontal baffle wall 8 extends across the room A just below the pipes 7. This baffle wall is secured to the side walls 2 of the room, and said wall 8 extends lengthwise through the room substantially the same distance as that of the pipes 7.

A bed of concrete 9 is laid on top of the upper layer of insulating material of the floor of the room A, and this bed of concrete is bordered with a curb 10 arranged around the walls of the room A to form a shallow water-proof basin for collecting any water that may accumulate within the room.

An endless apron conveyor B is disposed lengthwise along the bottom portion of the room A for transporting articles C therethrough. The framework of this conveyor comprises two rows of oppositely disposed angles 11 extending upwardly from the bed of concrete 9 along each side of the room A, respectively. A horizontal shaft 12 is mounted in bearings on the front pair of upright angles 11, and another shaft 12a is similarly mounted on the rear pair of upright angles 11, and sprocket wheels 13 are fixed on each end of these shafts. A pair of endless parallel sprocket chains 14 are mounted around these sprocket wheels. Said chains 14 are made up of links 15 which are pivoted on connecting pins 55

16 having rollers 17 thereon for engaging in the grooves of the sprocket wheels 13 for driving the chains. Mounted on each pin 16 is a small angle bracket 18, and these brackets 18 support transverse channel members 19 which are secured thereto, and which constitute the carrying surface of the apron conveyor B. A longitudinal strip member 20 is secured to each row of upright angles 11 along their upper ends, and these strip members are provided with upper and lower horizontal flanges forming guideways for the upper reach of the sprocket chains; and longitudinal angles 21 are secured to the upright angles 11 near the bottom thereof, and the horizontal flanges 21a of these angles form guideways for the lower reach of the sprocket chains. The shaft 12a at the rear end of the room A extends through the side wall thereof, and operatively connected to it is a suitable source of power (not shown) for driving the apron conveyor. Preferably, the angles constituting the lower guideways are bent downwardly as at 22 near the rear end of the room A to accommodate a sag in the lower reach of the apron conveyor adjacent to its rear end to insure smooth operation of the apron conveyor.

A second horizontal baffle wall 23 extends from the front of the room A to the rear thereof, and this baffle wall is secured to the side walls of the room A intermediate the upper and lower reach of the apron conveyor; and said wall is cut away at various places to accommodate the parts of the apron conveyor. Secured to the outer side of the rear wall of the room A near the top thereof are a pair of motors 24 which drive fans 25 located within the room A for circulating the air therein.

A narrow vestibule D made up of side walls 26, a floor 27, and a roof 28, extends perpendicularly outward from the side wall of the room A adjacent to the front end of the apron conveyor, and the side wall of the room A has a rectangular opening 29 therethrough located above the apron conveyor and communicating with the space between the side walls 26 of the vestibule D just below the roof 28 thereof. Located within the room A on the opposite side of the apron conveyor from the opening 29 is an upright bracket 30 secured to the lower baffle wall 23, and the upper end of this bracket carries a rotatably mounted pulley wheel 31. A larger pulley wheel 32 is fixed on a horizontal shaft 33 extending through the side walls 26 of the vestibule D near its outer end; and mounted around the two pulley wheels 31 and 32 is an endless conveyor belt 34 of slightly less width than that of the vestibule D. This belt passes through the opening 29 in the side wall of the room A, and said belt is adapted to deliver articles through the vestibule D into the hardening room A. A motor 35 located outside the vestibule D drives a gear speed reducer 36 which is operatively connected to the pulley wheel shaft 33 for driving the feeding belt 34; and a small idler pulley wheel 37, which is rotatably mounted across the vestibule D, supports the lower reach of the feeding belt 34, near the driving pulley wheel to bring the lower reach of the feeding belt up close to the upper reach thereof as they pass through the opening 29 in the side wall in the room A.

A pair of vertical, cylindrical rolls 38, hereinafter called spacer rolls, are placed opposite each other at the sides of the top reach of the feeding belt before it enters the room A. These spacer rolls are mounted on small vertical shafts 39 that are supported in brackets 40 secured on the outside of the side walls of the vestibule D, and said walls have openings therethrough to accommodate the rolls. The spacer rolls are spaced at such distance apart that they will contact with the respective sides of an article on the feeding belt, and they are arranged to rotate at a slower speed than that of the feeding belt so that they will retard the movement of articles thereon. Fixed on the lower ends of the spacer roll shafts 39 are bevel gears 41 which mesh with bevel gears 42 that are fixed on a horizontal shaft 43 extending through the vestibule D below the feeding belt conveyor. This shaft 43 extends parallel to the side wall of the room A, and is it mounted in a bearing provided on a bracket 44 secured to the side wall of the vestibule and in another bearing provided on the top of an upright support 45 located near the front wall of the room A. Fixed on the rear end of the shaft 43 is a sprocket wheel 46, and a second sprocket wheel 47 is fixed on the end of the shaft which drives the feeding belt; and mounted around these two sprocket wheels is an endless sprocket chain 48.

After articles are carried into the room A they are shifted from the feeding belt onto the apron conveyor by means of a circular reel 49 located above the top of the feeding belt. This reel comprises a horizontal hub shaft 50 supported in bearings in the side walls of the room, and said shaft is disposed in vertical alinement with the feeding belt. The hub shaft 50 within the room near each side wall is provided with three symmetrically arranged spokes 51 which carry horizontal pusher rods 52 between them, and the spokes are of such length that the pusher rods will pass close to the upper reach of the feeding belt when the circular reel rotates to shove articles off the feeding belt onto the apron conveyor.

The shifting reel is driven and controlled by a Geneva mechanism which is operatively connected to the horizontal shaft 43 which drives the spacer rolls. A bevel gear 53 is fixed on the front end of the shaft 43, and this gear 53 meshes with another bevel gear 54 which is fixed on the end of a horizontal shaft 55 extending in front of, and parallel to, the front wall of the room A, said shaft 55 being supported in bearings provided on the tops of upright supports 56 located near the front wall of the room A. The opposite end of the shaft 55 from the end carrying the bevel gear 53 is provided with a circular hub-member 57 having a radially disposed arm 58 which is provided with a horizontal pin-member 59 for engaging into radial slots 60 in a Geneva wheel 61 which is fixed on the end of a short shaft 62 disposed in alinement with the shaft 55 carrying the Geneva operating arm, and said shaft 62 is supported in a bearing provided on the top of an upright support 63 similar to the supports 56. Fixed on the end of the shaft 62 opposite the end carrying the Geneva wheel is a sprocket wheel 64. The end of the shifting reel shaft 50 extends through the side wall of the room A and has a sprocket wheel 65 fixed thereon; and mounted around the two sprocket wheels 64 and 65 is an endless sprocket chain 66.

The roof of the vestibule D is cut away at the outer end of the vestibule; and articles are delivered onto the top of the feeding belt by means of an inclined ramp 67 leading from a circular feeding platform 68 located on one side of the vestibule D. Mounted on the lower baffle wall in the rear end of the room A is a transverse receiving trough 69, and disposed along the bottom of this trough is the upper reach of an endless conveyor belt 70 for conveying the articles C out of the hardening room A. This discharging belt 70 passes through a vestibule E on the outside of the room A, and said discharging belt may be driven by any suitable means (not shown).

In the particular embodiment of my invention disclosed herein, the apron conveyor D is of such width with respect to that of the containers C that it will hold six containers spaced across it at intervals of one inch apart; and the size of the various parts of the driving mechanism are chosen so that the spacer rolls 38 will have a circumferential speed of one inch per container less than the speed of the feeding belt 34, and so that the Geneva mechanism will cause the circular shifting reel 49 to advance one-third of a revolution every time that the spacer rolls have passed six containers.

In the operation of the apparatus, articles are delivered from the feeding platform 68 down the inclined ramp 67 and onto the outer end of the feeding belt. The feeding belt then carries the containers toward the hardening room, but since the spacer rolls are traveling at a circumferential speed of one inch per container less than the speed of the feeding belt, the spacer rolls delay the movement of each container passing between them so that there will be one inch between them as they leave the spacer rolls, and when a group of six containers reaches the front end of the apron conveyor, the Geneva mechanism causes the circular reel to advance one-third of a revolution and thus cause one of its shifter rods to shove the group of containers simultaneously onto the apron conveyor; and it is to be noted that this method of shifting the articles from the feeding conveyor onto the apron conveyor does not disturb the relationship in position of the containers with respect to each other, but leaves them spaced apart. The apron conveyor then carries the articles to the rear end of the hardening room at which point they fall onto the discharging belt and are carried thereby out of the hardening room.

While I have described my invention used in connection with an ice cream hardening plant, it is obvious that my conveying apparatus may be used advantageously in transporting articles through drying rooms, painting rooms, or other like enclosures. Furthermore, as numerous changes may be made in the hereinabove described apparatus without departing from the scope of my invention, I do not wish to be limited to the precise constructions and arrangements of parts shown and described.

What I claim is:

1. In a construction of the kind set forth, an enclosed low and elongated chamber, cooling apparatus in the upper portion thereof, a longitudinally extending conveyor in the lower portion thereof, a horizontal partition between said cooling apparatus and said conveyor terminating short of the ends of said chamber, a fan for circulating air past said cooling apparatus and over said conveyor, a conveyor disposed transversely in the receiving end of said chamber and extending outside thereof, means for unloading articles from the transverse conveyor to said first mentioned conveyor, and a third conveyor disposed transversely in the delivery end of said chamber and extending outwardly therefrom.

2. In a construction of the kind set forth, an elongated heat-insulated chamber, cooling apparatus in the upper portion thereof, a longitudinally extending conveyor in the lower portion thereof, a horizontal partition between said cooling apparatus and said conveyor terminating short of the ends of said chamber, means for maintaining circulation of the air throughout said chamber, a conveyor disposed transversely in the receiving end of said chamber and extending outside thereof, means alongside said transverse conveyor for contacting with articles thereon and arranged to have its contacting portions move at a speed different from that of said transverse conveyor so as to space such articles apart, means for unloading such articles from the transverse conveyor onto said first mentioned conveyor, and means disposed transversely in the delivery end of said chamber and extending outwardly therefrom to receive articles from said first mentioned conveyor and deliver them outside of said chamber.

3. In a construction of the kind set forth, an enclosed low and elongated chamber, cooling apparatus in the upper portion thereof, a longitudinally extending conveyor in the lower portion thereof, a horizontal partition between said cooling apparatus and said conveyor terminating short of the ends of said chamber, means for maintaining circulation of the air in said chamber, a conveyor disposed transversely in the receiving end of said chamber and extending outside thereof, means alongside said transverse conveyor for contacting with articles thereon and arranged to move more slowly than said transverse conveyor so as to space such articles apart, a Geneva mechanism for unloading such articles periodically from the transverse conveyor onto said first mentioned conveyor, and a third conveyor disposed transversely in the delivery end of said chamber and extending outwardly therefrom.

4. In a construction of the kind set forth, an enclosed low and elongated chamber, cooling apparatus in the upper portion thereof, a longitudinally extending conveyor in the lower portion thereof, a horizontal partition between said cooling apparatus and said conveyor terminating short of the ends of said chamber, a fan for circulating air past said cooling apparatus and over said conveyor, a conveyor disposed transversely in the receiving end of said chamber and extending outside thereof, means for unloading articles from the transverse conveyor to said first mentioned conveyor, and a third conveyor disposed transversely in the delivery end of said chamber and extending outwardly therefrom, said chamber being entirely closed except for the openings for said transverse conveyors and said openings being relatively small.

ROY R. WORRALL.